United States Patent
Bhattacharyya et al.

(10) Patent No.: US 12,141,040 B1
(45) Date of Patent: Nov. 12, 2024

(54) FAILOVER CLUSTER MANAGEMENT USING A SEMI-BIDIRECTIONAL HEARTBEAT MECHANISM

(71) Applicant: Splunk Inc., San Francisco, CA (US)

(72) Inventors: Sayantan Bhattacharyya, Sydney (AU); Wendi Qiu, Norwest (AU); How Yin Tan, Sydney (AU); Amritpal Singh Bath, Alamo, CA (US); Iuri Chaer, London (GB)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 17/827,526

(22) Filed: May 27, 2022

(51) Int. Cl.
G06F 11/00 (2006.01)
G06F 11/20 (2006.01)

(52) U.S. Cl.
CPC .... G06F 11/2025 (2013.01); *G06F 2201/805* (2013.01)

(58) Field of Classification Search
CPC .............. G06F 11/202; G06F 11/2023; G06F 11/2025; G06F 11/2028; G06F 11/2038; G06F 11/2048
See application file for complete search history.

(56) References Cited

U.S. PATENT DOCUMENTS

| | | | | |
|---|---|---|---|---|
| 8,041,798 B1* | 10/2011 | Pabla | ................... | G06F 11/2028 709/201 |
| 2004/0153700 A1* | 8/2004 | Nixon | ....................... | G05B 9/03 714/4.1 |
| 2011/0289344 A1* | 11/2011 | Bae | ........................ | G06F 11/202 714/E11.073 |
| 2023/0083450 A1* | 3/2023 | Kaitha | ................ | G06F 11/2097 714/11 |

* cited by examiner

Primary Examiner — Michael Maskulinski
(74) *Attorney, Agent, or Firm* — Artegis Law Group, LLP

(57) ABSTRACT

A computer-implemented method of providing for dynamic cluster manager failover includes routing data traffic associated with managing network components in a cluster to an active cluster manager, where the active cluster manager manages a plurality of network components in the cluster. The method also includes transmitting periodic heartbeat request messages from a standby cluster manager to the active cluster manager. Further, the method includes detecting a loss of heartbeat response messages from the active cluster manager, where the heartbeat response messages are transmitted from the standby cluster manager to the active cluster manager in response to the periodic heartbeat request messages. The method also includes promoting the standby cluster manager to an active role and re-routing the data traffic associated with managing the network components to the currently active cluster manager.

20 Claims, 10 Drawing Sheets

FAILOVER CLUSTER MANAGEMENT USING A SEMI-BIDIRECTIONAL HEARTBEAT MECHANISM

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to store, search and analyze the data in a performant way.

One of the technical challenges is providing a networking infrastructure with both high availability of data and robust disaster recovery. In response to this, cluster architectures were developed. Briefly, a cluster architecture can be defined as multiple loosely coupled network devices that cooperate to provide client devices access to one or more services over the network.

However, some cluster architectures that are employed for data backup may spread different portions of data across a large number of members within the cluster to minimize the likelihood of loss of large amounts of data should one of the members fail. However, when loss of even a portion of the data may be significant to the clients depending upon the cluster, this may not be a tolerable result. The performance and capabilities of computing devices have increased dramatically since their introduction. However, computing devices of all types remain susceptible to device failures, whether from malfunctioning device hardware or from external conditions such as a loss of electrical power. For businesses and users that rely on computing devices, such failures can result in highly undesirable downtime and possible data loss.

For some computing environments, a cluster architecture may be configured to mitigate some of the problems caused by device failures. In general, a cluster consists of multiple computing devices that may be connected by a network and that operate in a coordinated fashion to provide access to data and/or one or more computing services. In order to provide for high data availability and the ability to recover from disasters, a cluster architecture may be configured to replicate data stored by the cluster across multiple components of the cluster. In this manner, if one or more of the cluster components fails, data stored by the failed components may be made available through one or more of the other components storing a replicated copy of the data.

Some cluster architectures that are employed for data backup may comprise a specialized cluster component, referred to herein as a cluster manager, which may be configured to coordinate various aspects of replicating data across data stores of the cluster and performing searches against data that has been replicated in a cluster. Because a cluster manager may be a single point of failure, a malfunction or a device failure associated with a cluster manager in a cluster architecture can be particularly problematic.

BRIEF DESCRIPTION OF THE DRAWINGS

Illustrative examples are described in detail below with reference to the following figures.

DETAILED DESCRIPTION

Figure 1:
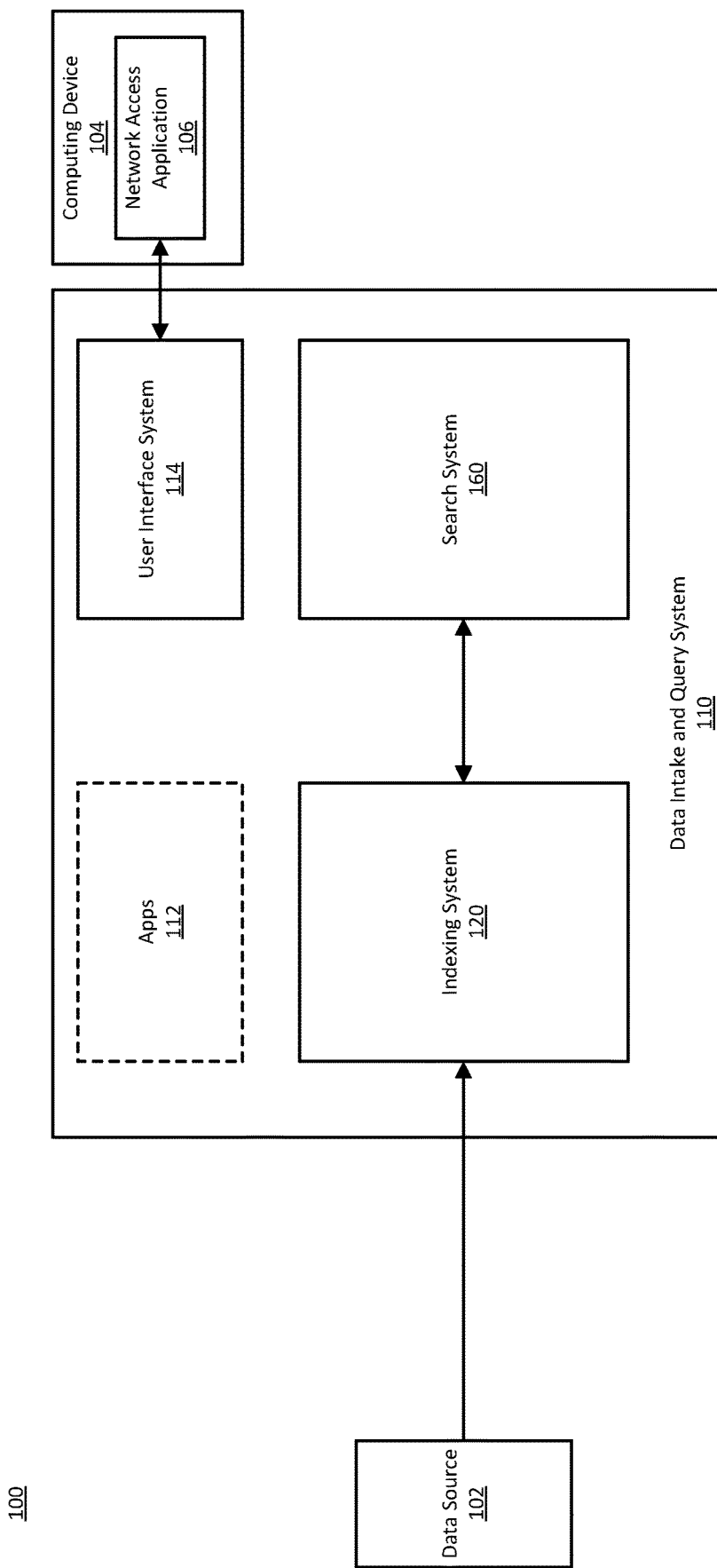
FIG. 1 is a block diagram illustrating an example computing environment that includes a data intake and query system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include apps 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine data from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing 120 system. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as retrieving events from an index, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 106. In such examples, the network access application 106 can access the user interface system 114 without going over a network.

The data intake and query system 110 can optionally include apps 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
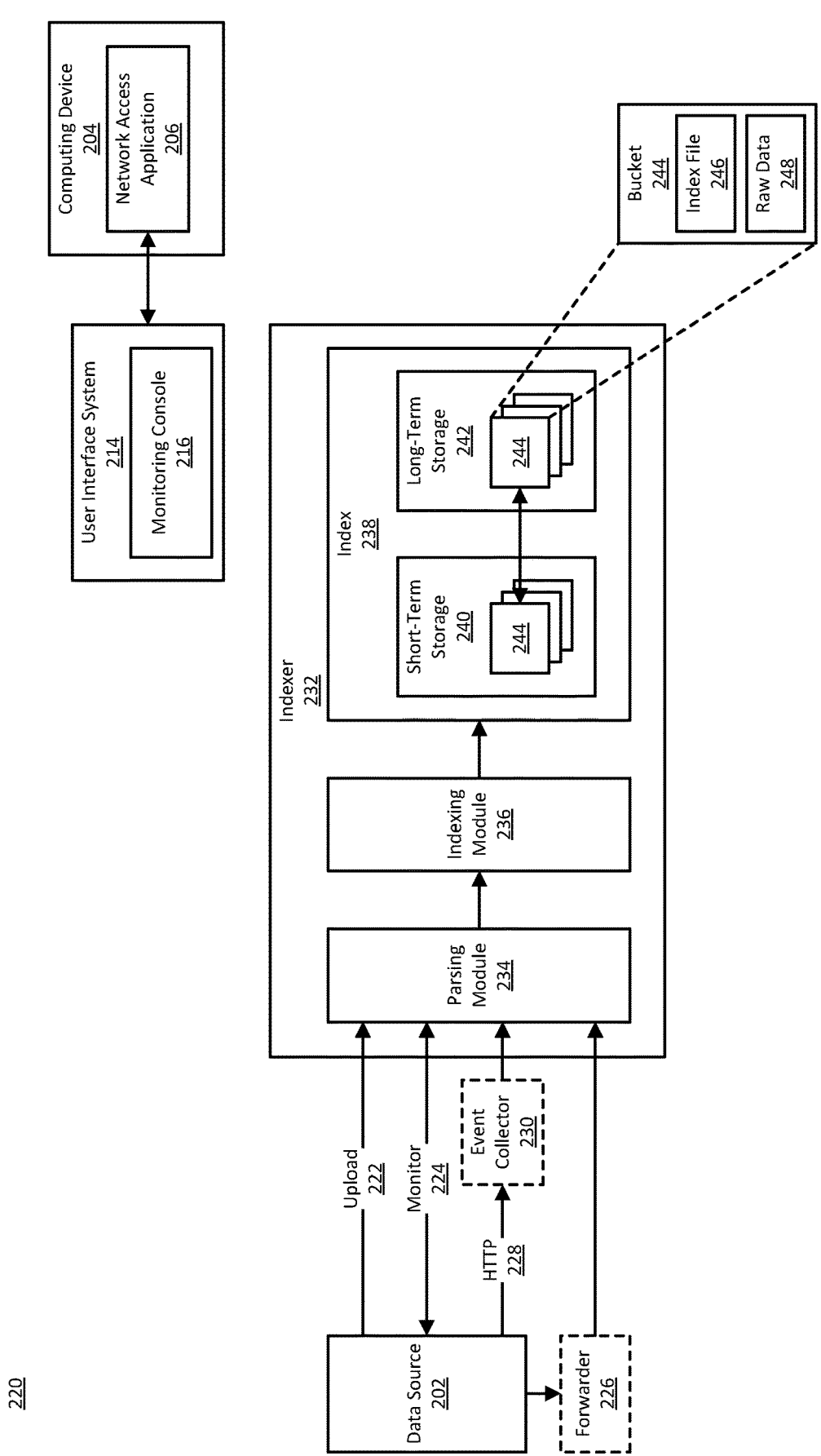
FIG. 2 is a block diagram illustrating in greater detail an example of an indexing system of a data intake and query system, such as the data intake and query system of FIG. 1.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 238 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 232; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further below. Uploading is a manual process and occurs when instigated by a user. For automated data ingestion, the other ingestion methods are used.

The monitor 224 method enables the indexing system 202 to monitor the data source 202 and continuously or periodically obtain data produced by the data source 202 for ingestion by the indexer 232. For example, using the monitoring console 216, a user can specify a file or directory for monitoring. In this example, the indexing system 202 can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executed on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and maintain separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been added to an index.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine include timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing component 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 246, to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

Building index data structures generates the index 238. The index 238 is a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 238 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the index 238 in directories referred to as buckets. The files in a bucket 244 can include raw data files, index files, and possibly also other metadata files. As used herein, "raw data" means data as when the data was produced by the data source 202, without alteration to the format or content. As noted previously, the parsing component 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index file 246, which may also be referred to herein as a "time-series index" or tsidx file, contains metadata that the indexer 232 can use to search a corresponding raw data file 248. As noted above, the metadata in the index file 246 includes a lexicon of the event data, which associates each unique keyword in the event data with a reference to the location of event data within the raw data file 248. The keyword data in the index file 246 may also be referred to as an inverted index. In various implementations, the data intake and query system can use index files for other purposes, such as to store data summarizations that can be used to accelerate searches.

A bucket 244 includes event data for a particular range of time. The indexing module 236 arranges buckets in the index 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the index 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
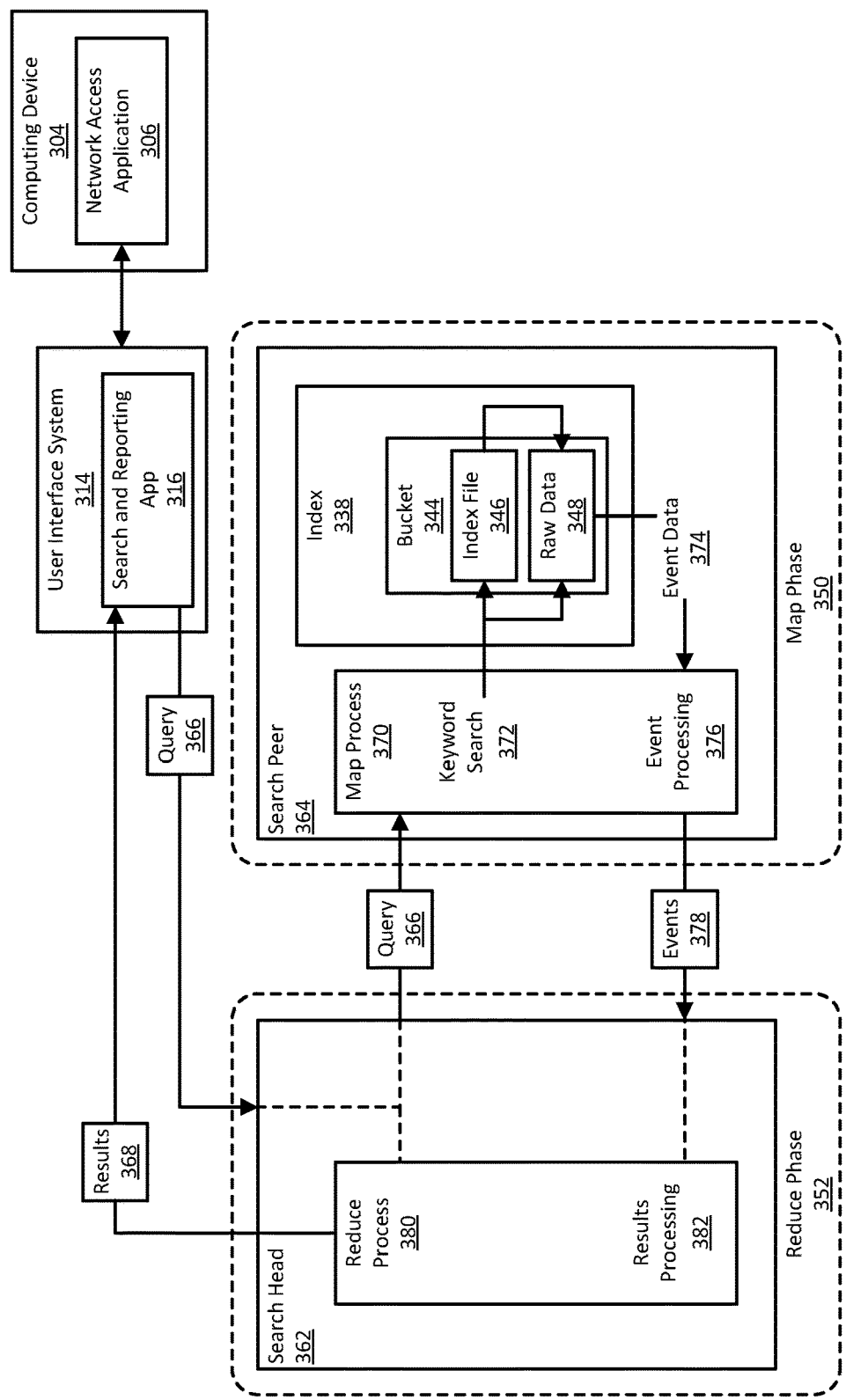
FIG. 3 is a block diagram illustrating in greater detail an example of the search system of a data intake and query system, such as the data intake and query system of FIG. 1.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to a search peer 364. Using a map process 370, the search peer 364 searches the appropriate index 338 for events identified by the query 366 and sends events 378 so identified back to the search head 362. Using a reduce process 382, the search head 362 processes the events 378 and produces results 368 to respond to the query 366. The results 368 can provide useful insights about the data stored in the index 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the search peer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("|" or "pipe") symbol.

In addition to one or more search commands, the query 366 includes a time indicator. The time indicator limits searching to events that have timestamps described by the time indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more search peers. In the map phase 350, the search peers locate event data that matches the search terms in the search query 366 and sorts the event data into field-value pairs. When the map phase 350 is complete, the search peers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more search peers, such as the search peer 364 illustrated in FIG. 3. "Search peer" is an alternate name for "indexer" and a search peer may be largely similar to the indexer described previously. The search peer 364 may be referred to as a "peer node" when the search peer 364 is part of an indexer cluster. The search peer 364, which may also be referred to as a search execution component, can be implemented using program code that can be executed on a computing device. In some implementations, one set of program code implements both the search head 362 and the search peer 364 such that the search head 362 and the search peer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular search peer 364. For example, the search system 360 may be configured to include multiple search peers that each have duplicative copies of at least some of the event data and are implanted using different hardware resources q. In this example, the sending the search query 366 to more than one search peer allows the search system 360 to distribute the search workload across different hardware resources. As another example, search system 360 may include different search peers for different purposes (e.g., one has an index storing a first type of data or from a first data source while a second has an index storing a second type of data or from a second data source). In this example, the search query 366 may specify which indexes to search, and the search head 362 will send the query 366 to the search peers that have those indexes.

To identify events 378 to send back to the search head 362, the search peer 364 performs a map process 370 to obtain event data 374 from the index 338 that is maintained by the search peer 364. During a first phase of the map process 370, the search peer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the search peer 364 performs a keyword search 374 using search terms specified in the search query 366. The search terms can be one or more of keywords, phrases, fields, Boolean expressions, and/or comparison expressions that in combination describe events being searched for. When segmentation is enabled at index time, the search peer 364 performs the keyword search 372 on the bucket's index file 346. As noted previously, the index file 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index file 346 that matches a search term in the query 366, the search peer 364 can use the location references to extract from the raw data 348 file the event data 374 for each event that include the searchable term.

In cases where segmentation was disabled at index time, the search peer 364 performs the keyword search 372 directly on the raw data 348 file. To search the raw data 348, the search peer 364 may identify searchable segments in events in a similar manner as when the data was indexed. Thus, depending on how the search peer 364 is configured, the search peer 364 may look at event fields and/or parts of event fields to determine whether an event matches the query 366. Any matching events can be added to the event data 374 read from the raw data 348 file. The search peer 364 can further be configured to enable segmentation at search time, so that searching of the index 338 causes the search peer 364 to build a lexicon in the index file 346.

The event data 374 obtained from the raw data 348 file includes the full text of each event found by the keyword search 372. During a third phase of the map process 370, the search peer 364 performs event processing 376 on the event data 374, with the steps performed being determined by the configuration of the search peer 364 and/or commands in the search query 366. For example, the search peer 364 can be configured to perform field discovery and field extraction. Field discovery is a process by which the search peer 364 identifies and extracts key-value pairs from the events in the event data 374. The search peer 364 can, for example, be configured to automatically extract the first 100 fields (or another number of fields) in the event data 374 that can be identified as key-value pairs. As another example, the search peer 364 can extract any fields explicitly mentioned in the search query 366. The search peer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 364 sends processed events 378 to the search head 362, which performs a reduce process 380. The reduce process 380 potentially receives events from multiple search peers and performs various results processing 382 steps on the received events. The results processing 382 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 316. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
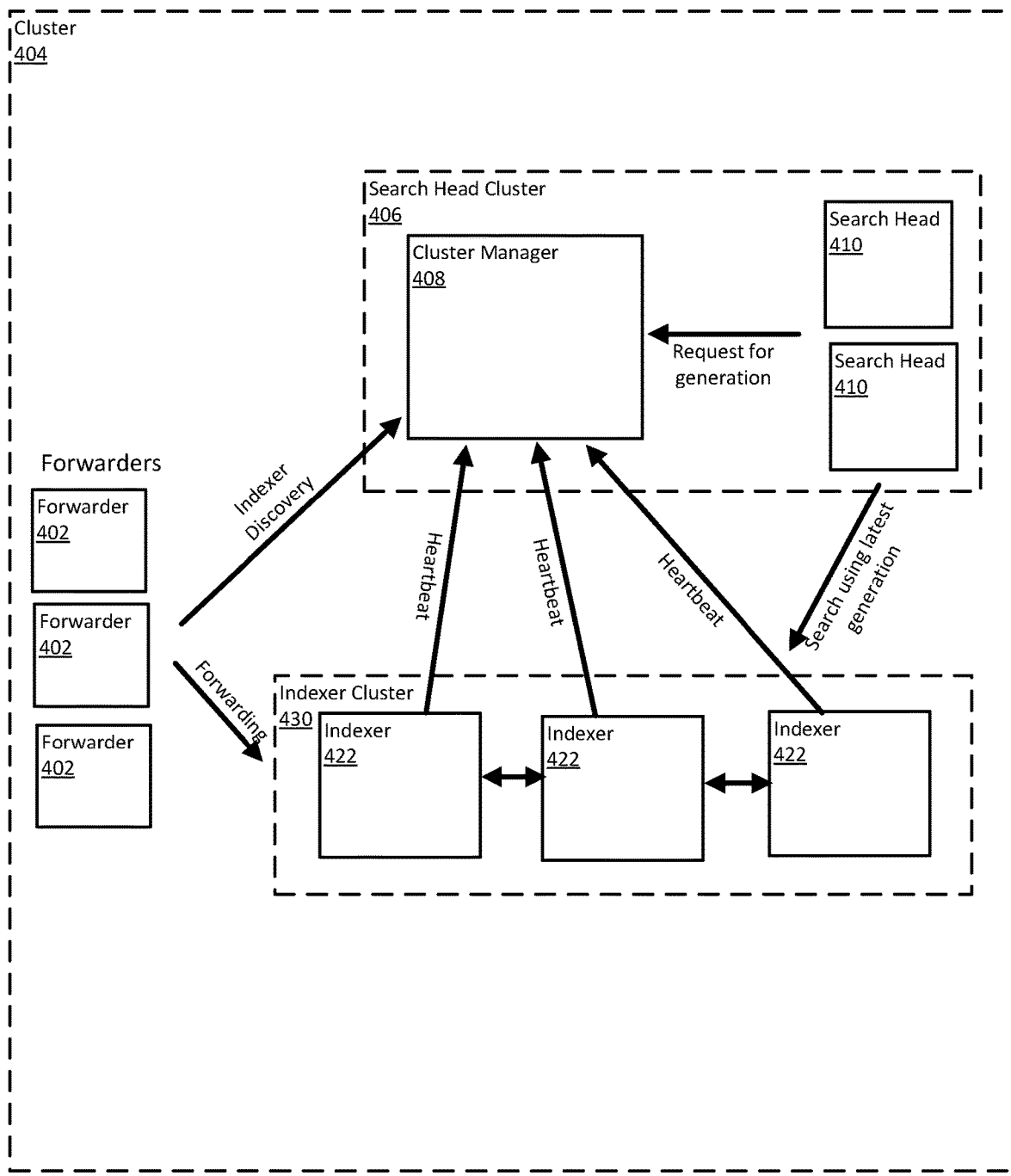
FIG. 4 is a block diagram illustrating a typical network topology for a cluster.

It should be appreciated that, to achieve high availability and to provide for disaster recovery of data stored in the data intake and query system 110 illustrated in FIG. 1, the system may be configured to operate as a cluster. FIG. 4 is a block diagram illustrating a typical network topology for a cluster 404. A clustered data intake and query system as described herein generally may include multiple system components (e.g., forwarders 402, indexers 422, and/or search heads 410) configured to operate together in a coordinated fashion. Forwarders 402 perform substantially the same function as the forwarder 226 of FIG. 2 while the indexers 422 perform substantially the same function as the indexer 232 of FIG. 2.

The components of the cluster 404 may be comprised within an "on-prem" implementation, e.g., the cluster 404 may be associated with a network controlled and utilized by a single entity. Alternatively, the cluster 404 may be distributed "in the cloud" and may be utilized by several different entities. In some implementations, the cluster 404 is a hybrid cluster deployment that includes both on-prem and cloud-based computing resources. In any implementation, the cluster may be implemented as a multisite deployment. Multisite clusters are advantageous because storing copies of the data at multiple locations improves disaster recovery. Further, multisite clusters provide site failover capability. If a site goes down, indexing and searching can continue on the remaining sites without interruption or loss of data.

To provide for high availability and disaster recovery in a clustered system, data processed and stored by an indexer in the cluster 404 may be replicated across one or more other indexers associated with an indexer cluster 430 in accordance with a user configurable data replication policy. The indexers 422 receive and index data, and also send and receive replicated data to and from other indexers in the indexer cluster 430. Like all indexers, the indexers 422 in the indexer cluster 430 are also configured to search across their indexed data in response to search requests from the search heads 410. It should be noted that the purpose of indexer clusters is to provide highly available data through coordinated groups of indexers. The indexers 422 are not required to be configured as part of an indexer cluster and, in some implementations, one or more of the indexers 422 may be configured as standalone indexers. In such configurations, search heads may configure the indexers as distributed search peers for performing searches.

In one implementation, a separate dedicated node of the cluster may be configured as a specialized cluster component, referred to herein as a cluster manager 408 (hereinafter "CM"). The CM 408 is configured to manage data traffic to and from the indexers 422 and to coordinate various aspects of replicating data across the indexers 422. The CM 408 also helps to manage the configuration of the indexers 422 and orchestrates remedial activities if an indexer goes offline. The indexers 422 typically transmit periodic heartbeat messages to the CM 408 when online to indicate their respective statuses.

In some implementations, CM 408 may also provide the search heads 410 with information on finding the data to be searched. The CM 408 coordinates with the search heads 410 to schedule and perform searches against data that has been replicated across the indexers 422. While search head clusters provide high availability and scalability for groups of search heads, it is not necessary for search heads to be organized into clusters. Accordingly, the search heads 410 may be standalone search heads or they may be configured as part of a search head cluster 406 as shown in FIG. 4.

In addition to coordinating data replication and search scheduling, in some implementations, the CM 408 can also serve as a search head just like any other search head in the cluster using generation information created by the CM, further described below. The CM 408 may, in some implementations, also be configured to perform forwarder functions to push its internal logs to the indexing tier. However, configuring a CM as a search head or a forwarder, or vice versa, may significantly increase processing loads on the particular node.

The search head cluster 406 typically comprises two or more search heads that serve as a central source for searching. The search head cluster 406 may take the place of an independent search head where each search head in the search head cluster coordinates with peer search heads in the search head cluster to schedule jobs, replicate query results, update configurations, fulfill query requests, etc. Each search head in the search head cluster 406 communicates with the CM 408, which provides the search head with a list of indexers to which the search head can distribute a user-submitted query. The CM 408 maintains a list of active indexers. A search head may communicate with the CM 408 before the search head distributes queries to indexers to discover the addresses of active indexers.

A cluster configured with a data replication policy causes replicated copies to be stored for each bucket created by an indexer of the cluster. When a search query is received by one of the search heads 410, the search head may distribute the search query to all of the indexers 422 of a cluster. However, if multiple indexers in the cluster store copies of one or more buckets that contain data that partially satisfies the search query, duplicate search results may be returned to the search head. To ensure that only one indexer of a cluster returns results from each bucket when multiple copies of the buckets exist in the cluster, one indexer is designated as the "primary" indexer for each bucket while other indexers storing copies of the same bucket are designated as "secondary" indexers. An indexer that is designated as the primary indexer for a bucket has primary responsibility for returning results from that bucket that are responsive to search queries received by the primary indexer, while secondary indexers do not respond to search queries with results from secondary copies of the same bucket.

For each bucket that is replicated across multiple indexers 422 of a cluster 404, the designation of one indexer as the primary indexer and other indexers as secondary indexers may change over time. In one embodiment, a mapping of cluster indexers as either the primary indexer or a secondary indexer for each bucket may be represented using the concept of a "generation." In general, a generation represents a "snapshot" of the cluster 404 at a particular point in time and identifies which indexers are primary and which indexers are secondary for each bucket and replicated copy of a bucket stored in the cluster. The CM 408 may be responsible for creating a generation mapping and distributing the generation mapping to other components of the cluster.

A CM may create multiple different generations with different mappings over time as conditions within the cluster change. Each generation may be identified by a unique generation identifier represented, for example, by a monotonically increasing counter or other set of unique values. For example, a first generation may be represented by a generation identifier of zero (generation 0), a second generation represented by a generation identifier of one (generation 1), and so forth. Thus, for a first generation 0, a particular indexer X of a cluster may be designated as the primary indexer for a particular bucket Z that is replicated across a number of indexers in the cluster. At a later time, a new generation 1 may be created and a different indexer Y instead may be designated as the primary indexer for the same bucket Z. The CM 408 may create new generations and corresponding generation identifiers in response to a number of different cluster events including, but limited to, any of: the CM initializing, a new indexer joining the cluster, a current indexer failing or leaving the cluster, to rebalance the buckets of a cluster, etc.

As shown in FIG. 4, before transmitting a search request to the indexers 422, the search heads 410 request and obtain generation information (e.g., the generation mapping, a generation identifier, etc.) from the CM 408. For example, the search heads 410 may refresh generation information from the CM 408 at regular intervals (i.e., every 5 seconds). The search head may then broadcast the search request to the various indexers 422 in the indexer cluster 430 in accordance with the generation information retrieved from the CM 408.

As indicated in the discussion associated with FIG. 2, a forwarder is a software process that ingests and forwards data from a data source to one or more of the indexers 422. The forwarders 402 typically perform indexer discovery during which they receive information about the available member indexers from the CM 408. In response to receiving the available indexer information, the forwarders 402 transmit data to the indexers 422. When an indexer receives data from one of the forwarders 402 in FIG. 4, the indexer may store the data in one or more grouped subsets, or buckets, each corresponding to a time range associated with the data in the bucket. The forwarders 402 may select an indexer within cluster 430 based on any of a variety of mechanisms. Forwarders may make the selection based on a load-balancing algorithm, including a least loaded algorithm, a fastest response algorithm, a round-robin, random selection, or any of a variety of other mechanisms. In certain implementations, the forwarder 402 may elect to select a different indexer to manage the data storage and replication when the selected member indexer fails to provide an acknowledgement in response to receiving data from the forwarder 402 for storage.

The CM 408 may be a single point of failure within the cluster 404 and, accordingly, a malfunction or a device failure associated with a CM in a cluster architecture creates significant challenges. For example, if a CM fails and search heads in the cluster restart or require configuration changes, which is common during outages, the search heads lose track of associated indexers and searching fails. Conventionally available methods of providing CM failover require significant manual intervention by an administrator of the data intake and query system. In order to facilitate high availability clustering, implementations of the data intake and query system disclosed herein monitor CM service loss or degradation and provide an efficient mechanism for dynamic CM failover.

In one implementation, CM failover involves automatically switching CM functions to a standby CM (e.g., another dedicated node in the cluster) if the primary CM fails or is shut down for servicing. Building redundant CMs into the cluster advantageously allows seamless searching and indexing services during CM failure or maintenance activities. Further, it provides a mechanism to achieve rolling upgrades of the CM. By comparison, conventional means of providing for CM failover that require manual intervention are not seamless. Manual intervention results in search interruption and fails to provide the requisite performance and scaling required for high availability clustering.

Failover Cluster Management Using a Semi-Bidirectional Heartbeat Mechanism

Figure 5:
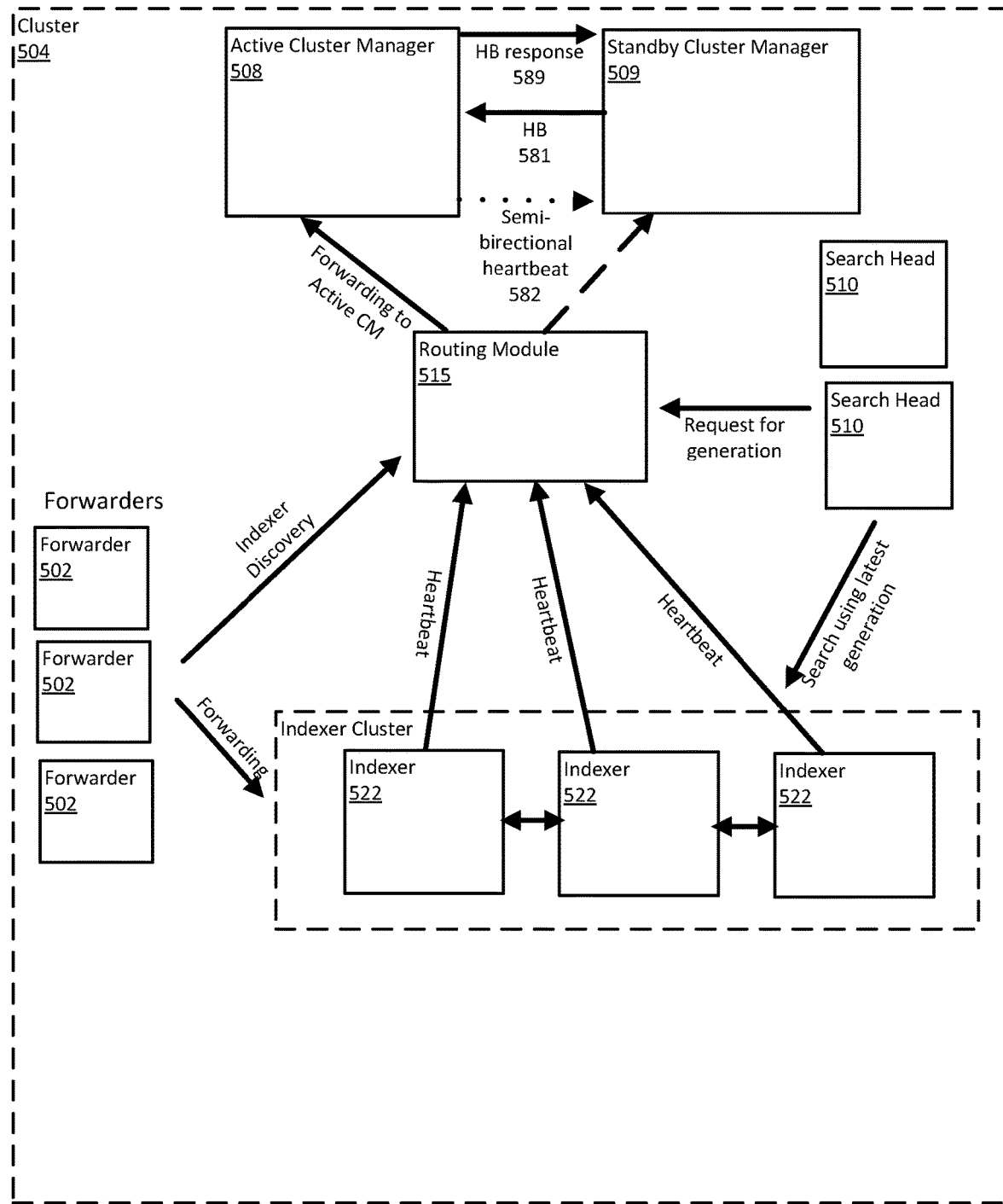
FIG. 5 is a block diagram illustrating a manner in which to configure automatic CM failover using a semi-bidirectional heartbeat mechanism, in implementations according to the present disclosure.

FIG. 5 is a block diagram illustrating a manner in which to configure automatic CM failover using a semi-bidirectional heartbeat mechanism, in implementations according to the present disclosure. The cluster 504 of FIG. 5 provides high availability and disaster recovery capability by configuring a standby CM 509 (a CM currently in a 'standby' role) in addition to an active CM 508 (a CM currently in an 'active' role) to provide backup capability to the active CM 508. It should be noted that when a new CM in standby mode is initiated, it will synchronize with an active CM in the cluster so that all the pertinent information associated with the cluster is transferred over to the standby CM from the active CM. Although only one standby CM is shown in FIG. 5, it should be understood that the cluster architectures illustrated in FIG. 5, as well as in FIGS. 6A and 6B below, may include multiple standby CMs to support backup capabilities for the active CM.

Note that other implementations of cluster 504 may comprise multiple standby CMs. Selecting an active CM from amongst two or more CMs at system startup may comprise checking pre-configured arbitration logic to determine which CM should be operated in the active status. For example, selecting an active CM may comprise checking a pre-configured priority list which ranks the CMs in order of priority. Where multiple CMs are present in a cluster, the priority list is checked each time an active CM of the cluster fails in order to determine which CM is associated with the next highest priority level and should be promoted to active status.

The cluster 504 further comprises a routing module 515, which is configured to direct traffic between an active CM of the cluster 504 and other components of the cluster 504, e.g., search heads 510, indexers 522 and forwarders 502. CM failover between the active and standby CMs is implemented by configuring the routing module 515 to direct traffic to whichever of the two CMs is in an active state (or has an 'active' role). Building CM redundancy into the cluster 504 by providing for a standby CM in the event that the active CM fails is advantageous both in terms of cost and ease-of-implementation. Further, CM failover implemented using a routing module 515 allows data forwarding, ingestion and searching to continue normally without being affected by a switch-over from one CM to another.

The routing module 515 directs all communication it receives from the other components in the cluster 504 to the active CM 508. Instead of search heads communicating directly with a CM as shown in FIG. 4, the search heads 510 of FIG. 5 communicate with the active CM 508 using the routing module 515 as a gateway. For example, the search heads 510 communicate with the routing module 515 in order to receive generation information (from the active CM 508) and then distributes the searches to the indexers 522 in accordance with the received generation information. Similarly, instead of forwarders communicating directly with the CM as shown in FIG. 4, the forwarders 502 of FIG. 5 perform indexer discovery by communicating with the CM 508 using the routing module 515 as a gateway. It should be noted that the cluster 504 of FIG. 5 may be associated with a single site or may be dispersed across multiple sites. For example, cluster 504 may be a multisite cluster distributed in the cloud and/or on-prem where active CM 508 and standby CM 509 are configured at different locations. As discussed further in connection with FIG. 6B, in some implementations of a multisite deployment, individual routing modules may be implemented for each site; each of these routing modules would route the traffic from the other components to the active CM.

In one implementation, the routing module 515 may be a load balancer, a proxy server, or may be configured to implement a Domain Name System (DNS) solution. In instances where the routing module 515 is implementing a DNS solution, an administrator may configure the routing module 515 with DNS records that point to the active CM 508. When switching over to the standby CM 509, an administrator may change the DNS records so the CM facing traffic from the various nodes in the cluster 504 may be redirected to the standby CM, which is now promoted to the next active CM.

Where the routing module 515 comprises a load balancer or a proxy server, it owns IP addresses unique to it. Requests from the various components in the cluster 504 get routed to the routing module 515. The search heads 510, the indexers 522, and the forwarders 502 may, for example, be configured in software to direct their requests to the routing module 515. The routing module 515 may be configured to perform a periodic "health check" to detect the active CM 508 or to confirm its "healthy" status. The standby CM 509 will typically return an "unhealthy" status to the routing module 515 while the active CM 508 remains "healthy."

Further, the standby CM 509 periodically transmits heartbeat messages to the active CM 508. A loss of the heartbeat response signal to the standby CM 509 from the active CM indicates that the active CM is down or offline, in which case the standby CM may take over the active role (as will be described in further detail below). While the active CM is online and healthy, however, the standby CM will continue to return an "unhealthy" status to the routing module 515, indicating that all traffic should be directly to the "healthy" active CM 508.

Conventional high availability clusters typically employ a bi-directional heartbeat between a manager node and its redundant counterparts. A bi-directional heartbeat adds additional strain on a manager node that under typical circumstances is busy coordinating and scheduling multiple tasks.

Implementations of the data intake and query system disclosed herein utilize a heartbeat mechanism that, under normal operating conditions, is unidirectional and is transmitted from the standby CM 509 to the active CM 508 at periodic intervals. A heartbeat request signal 581 in FIG. 5 is transmitted periodically from the standby CM 509 to the active CM 508. Under normal operating conditions there is no heartbeat request signal that is transmitted from the active CM 508 to standby CM 509. The active CM 508 does, however, transmit a heartbeat response signal 589 from the active CM 508 to the standby CM 509 in response to the heartbeat request signal 581.

In one implementation, the heartbeat request signal 581 from the standby CM 509 comprises all the information necessary to refresh a status of the standby CM 509, as tracked and maintained by the active CM 508. The heartbeat response signal 589 from the active CM 508 meanwhile comprises information needed to refresh a status of the active CM 508, as tracked and maintained by the standby CM 509, including any metadata that enables the standby CM 509 to detect any change of state or data at the active CM 508. Note that if there is a change of state or data at the active CM end, the standby CM 509 may invoke separate Application Programming Interface (API) calls towards the active CM to fetch the updated data. Using a unidirectional heartbeat mechanism is advantageous because it reduces the processing load on the active CM 508, especially in instances where there are more than one standby CMs (which would ordinarily require the active CM to generate and track multiple heartbeat request signals).

In one implementation of the data intake and query system disclosed herein, responsive to a determination the active CM 508 has not responded to a heartbeat request for either a pre-programmed duration of time or number of heartbeat requests 581, the standby CM 509 performs certain checks in the cluster to verify if the active CM 508 is offline or has malfunctioned in some way prior to taking on the role of an active CM. A "split-brain prevention" strategy is a type of check that the standby CM 509 can perform to verify that the active CM 508 is indeed offline. Details of the split-brain prevention strategy will be discussed in more detail further below. If after performing the various checks, the standby CM 509 is able to confirm that the active CM 509 is offline, the standby CM 509 can take over as the active CM for the cluster.

When a standby CM attempts to switch over to active status, there may be certain exceptional circumstances where even though a heartbeat response from an active CM has not been registered at the standby CM 509, the active CM 508 may still be online and attempting to coordinate activities for the cluster 504. Accordingly, to address a situation where a cluster may have two CMs active at the same time, the standby CM may initiate a procedure called an "active-active recovery" process (hereinafter referred to as the AAR process).

The AAR process may be initiated by a standby CM when it takes over an active role, but it may also be initiated by an active CM if it detects that the standby CM has stopped sending heartbeat request signals for a certain pre-programmed threshold of time. In fact, an AAR thread may be spawned as part of a discovery process for each non-responding CM when a CM is first initiated. An extreme example of a circumstance in which an AAR process may be required is where the standby CM and indexers have been split off from the active CM because of, for example, network partitioning issues. If other checks performed by the standby CM (e.g., a split-brain prevention strategy) have also failed, a recovery mechanism is required to resolve this exceptional state where each CM has lost communication with the other CM.

In one implementation, as part of the AAR process, each CM in the cluster initiates a dedicated thread that keeps attempting to send heartbeat requests to a non-responding target until the exceptional state is resolved. It should be noted that during the AAR process, the heartbeat mechanism becomes bidirectional. As mentioned above, under normal circumstances, the active CM does not transmit heartbeat request signals to standby CMs and, accordingly, the heartbeat requests are unidirectional (from a standby CM to an active CM). During the AAR process, however, each CM (both active and standby) initiates heartbeat requests to non-responding targets. The CM 508, as a result, will now initiate a heartbeat request signal 582 to CM 509 at the same time as the CM 509 also transmits a heartbeat request signal 581 to CM 508. Note that because an active CM is able to initiate heartbeat request signals to the standby CMs during exceptional circumstances (e.g., during an AAR process), the heartbeat mechanism between the CMs in the cluster may be regarded as a "semi-bidirectional." Further, the heartbeat request signal 582 from the active CM 508 to the standby CM 509, which is employed typically in exceptional circumstances, may be regarded as a "semi-bidirectional" heartbeat signal.

The semi-bidirectional heartbeat signal is maintained during an AAR process until the exceptional state is resolved. In the example above (where the active CM has lost communication with the other elements in the cluster because of network partitioning issues), until the partitioning issues are resolved, both the active and standby CMs will continue to send heartbeat request signals to each other. In this case, the heartbeat requests from both CMs continue to fail due to the network partitioning. Once the partitioning issues are resolved, the heartbeat request signal from each CM can be detected at the other CM. Accordingly, both the active and standby CMs are able to detect that an AAR process is underway. Each CM is then able to check certain preset configurations (e.g., a priority list) to determine which of the CMs should take on the role of the active CM and which of the CMs should be demoted to a standby status. For example, the priority list may assign one of the two or more CMs a higher priority score than the other CMs. Accordingly, the CM with the higher priority score, barring any other exceptional circumstances, will be designated as the active CM. It should be noted that the automatic failover and the AAR procedures discussed in connection with FIG. 5 may also be implemented on the multi-site architectures discussed in connection with FIGS. 6A and 6B.

As mentioned above, the role of the periodic heartbeat request message from a standby CM to an active CM, under normal operational circumstances, serves several purposes: a) the heartbeat request periodically refreshes the state data of the standby CM for the active CM; b) the heartbeat response signal comprises metadata that indicates any data or state changes at the active CM; and c) the consecutive loss of the heartbeat responses from the active CM to the standby CM is a preliminary indicator that a malfunction has arisen at the active CM end and that the standby CM may need to switch over to active status in response. The consecutive loss of heartbeat responses from an active CM is, however, not a decisive factor that there is a problem at the active CM. As mentioned earlier, a "split-brain prevention" strategy may be one of multiple checks that a standby CM may perform to verify that the active CM 508 is inactive.

Figure 6A:
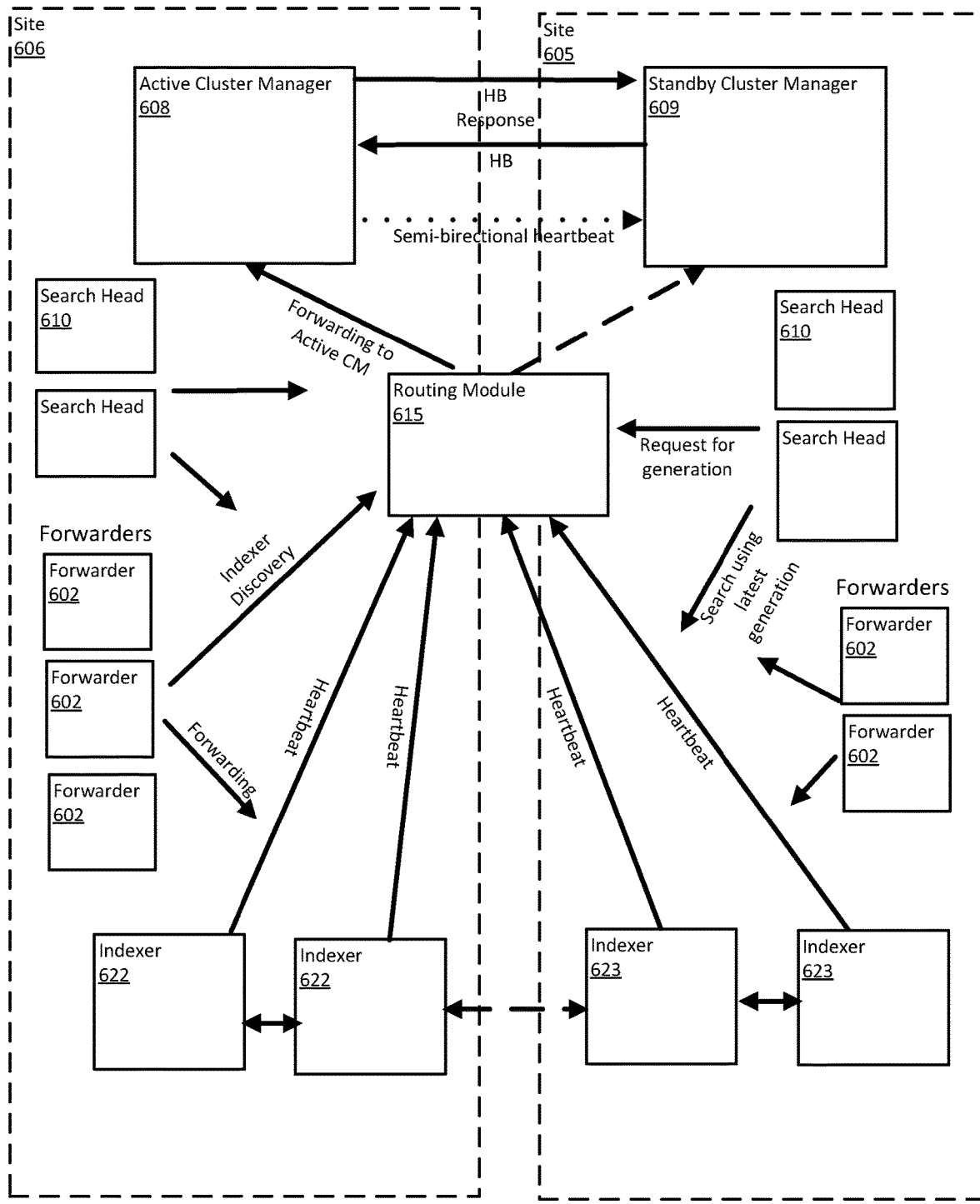
FIG. 6A is a block diagram illustrating a manner in which to implement a split-brain prevention strategy when configuring automatic CM failover in a multi-site cluster, in implementations according to the present disclosure.

Implementing a Split-Brain Prevention Strategy when Configuring Automatic Cluster Manager Failover FIG. 6A is a block diagram illustrating a manner in which to implement a split-brain prevention strategy when configuring automatic CM failover in a multi-site cluster, in implementations according to the present disclosure. A cluster may be dispersed over multiple sites as discussed above. For example, as shown in FIG. 6, an active CM 608 and a subset of the indexers 622 may be configured at a first site 606, while a standby CM 609 and a subset of the indexers 623 may be configured at a second site 605. Search heads 610 and forwarders 602 may be configured at each of the sites. Routing module 615 may be configured at one of site 606 or 605. However, in some implementations routing module 615 may be configured at a site separate from site 605 and 606*d*.

In one implementation, as part of a split-brain prevention strategy, a standby CM 609, which has not received a heartbeat response signal from an active CM 608 for a predetermined interval of time, may attempt to establish communication with the active CM 608 through one or more indexers associated with the one or more sites (e.g., indexers 622 and indexers 623) prior to nominating itself as the new active CM. In other words, if heartbeat response messages from an active CM halt for a designated duration, prior to taking over as active manager of the cluster, a standby CM 609 will confirm that the active CM 608 is offline by attempting to connect with the active CM through one or more indexers at the various sites over which the cluster is dispersed.

The standby CM 609 may detect a loss of the heartbeat response message from the active CM 608 in various situations. By way of example, the active CM 608 may suddenly become inactive, e.g., it may either be offline or it may be determined as "unhealthy" at the routing module 615. For example, an active CM 608 may be unresponsive due to deadlock, or may return a particular HTTP code due to low memory. This causes the routing module to detect active CM 608 as unhealthy. In response, the routing module 615 may stop forwarding traffic to the active CM 608. Alternatively, the standby CM 609 may experience a communication or connectivity failure within the cluster. As yet another example, the active CM 608 and standby CM 609 may lose communication during a partition event.

Responsive to detecting the heartbeat response loss from the active CM, the standby CM may select a predefined number or percentage of indexers from each site (e.g., sites 605, 606, etc.) from a list of indexers maintained for the cluster. Typically, the standby CM will only select indexers that are known to be active based on a status map received from the active CM. In one implementation the selection may be random or non-deterministic. In an implementation, the standby CM will invoke requests (referred to herein as "reachability check requests") to the selected indexers to establish communication with ("ping") the active CM 608 in real-time to determine if the indexers can establish communication with the active CM 608. For example, such communication may be implemented through a REST based call. The reachability check requests, in one implementation, are invoked to the selected indexers in parallel in order to avoid any significant delays.

In one implementation, the reachability check requests can result in three different categories of responses. If a standby CM is unable to reach an indexer, a ping status is categorized as "indeterminate." If the standby CM is able to reach the indexer, but the indexer is unable to reach the active CM, the ping status is categorized as a "failure." If the standby CM is able to reach the indexer, and the indexer is able to reach the active CM, the ping status is categorized as a "success."

In one implementation, once all the ping responses have been received at the standby CM from the indexers, the standby CM uses the information to determine whether it should replace the active CM as the new active CM. For example, if the ping status for at least one of the indexers is a "success," indicating that at least one indexer was able to confirm that the active CM is still online, the standby CM may abort any attempt to take over as the new active CM.

In the circumstance where none of the indexers return a ping "success" and where the standby CM was unable to connect to any indexers from sites other than its own site resulting in "indeterminate" ping statuses from all indexers, the standby CM may conclude that its own connection status within the network is unreliable. Accordingly, the standby CM may abort to take over as the new active CM.

In a situation where none of the indexers return a ping "success," then the standby CM determines whether, out of the indexers pinged, a designated number of indexers from each site voted the active CM as being inactive or offline. For example, if at least half the indexers from each site confirm that the active CM is down (i.e., with a "failure" ping status), then the standby CM takes over as the new active CM for the cluster. Further, it advertises itself as "healthy" to the routing module 515. The routing module 515 then starts forwarding traffic to the new active CM (the former standby CM 609), and the indexers (e.g., indexers 622, 623, etc.) are re-added to the new active CM automatically. Further, the search heads 610 can thereafter request generation information from CM 609 (the former standby, but now active CM). Also, the forwarders 602 can perform indexer discovery by making requests to CM 609 using the routing module 615 as a gateway.

Here, as previously explained, the CM 608 may still be operating in an active role despite loss of connectivity with CM 609 and various indexers. For example, connectivity for the CM 608 may be restored after a ping status has already been categorized as a "failure." Thus, when connectivity is restored, both CM 608 and CM 609 will be operating in an active role, causing a "split-brain" state, and thereby initiating the AAR process. As explained above, the AAR process may be initiated by a standby CM when it takes over an active role, but it may also be initiated by an active CM if it detects that the standby CM has stopped sending heartbeat request signals for a certain pre-programmed threshold of time. In fact, an AAR thread may be spawned as part of a discovery process for each non-responding CM when a CM is first initiated. As also noted above, in one implementation, as part of the AAR process, each CM in the cluster initiates a dedicated thread that keeps attempting to send heartbeat requests to a non-responding target until the exceptional state is resolved. It should be noted that during the AAR process, the heartbeat mechanism becomes bidirectional and remains operational until the exceptional state is resolved.

Alternatively, when attempting to switch over to active status, if the standby CM is unable to get consensus from the selected indexers at the different sites (e.g., less than half the indexers voting the active CM as being inactive or offline), it may temporarily abort any attempt to take over as the new active CM but may retry the process using exponentially backed off intervals. At each exponentially backed off interval, the standby CM tries securing votes from randomly or non-deterministically selected indexers at each site. Randomly selecting indexers at each site reduces the load on specific indexers while also soliciting votes from a set of indexers that is different from prior attempts. This is particularly advantageous if any of the indexers polled during a prior attempt were unreachable. Polling a different set of indexers at each backed off interval increases the probability of accurately verifying the status of the active CM.

As mentioned previously, indexers typically transmit periodic heartbeat messages to the active CM (via routing module 615) when online to indicate their respective statuses. In one implementation, instead of the indexers 622 and 623 affirmatively pinging the active CM in real-time responsive to a reachability check request, the indexers may simply report its connectivity state with the active CM to a standby CM in response to the reachability check request. In other words, in response to a reachability check request from a standby CM, the indexers are able to simply report back the results of their heartbeat requests to the active CM instead of separately pinging the active CM. For example, if an indexer has not received any heartbeat responses from the active CM for a given duration of time, the indexer may report that the active CM is offline in response to the reachability check request. In this way information that is already tracked by the indexers can be leveraged, which minimizes the processing loads on the indexers and also reduces the switchover time.

Figure 6B:
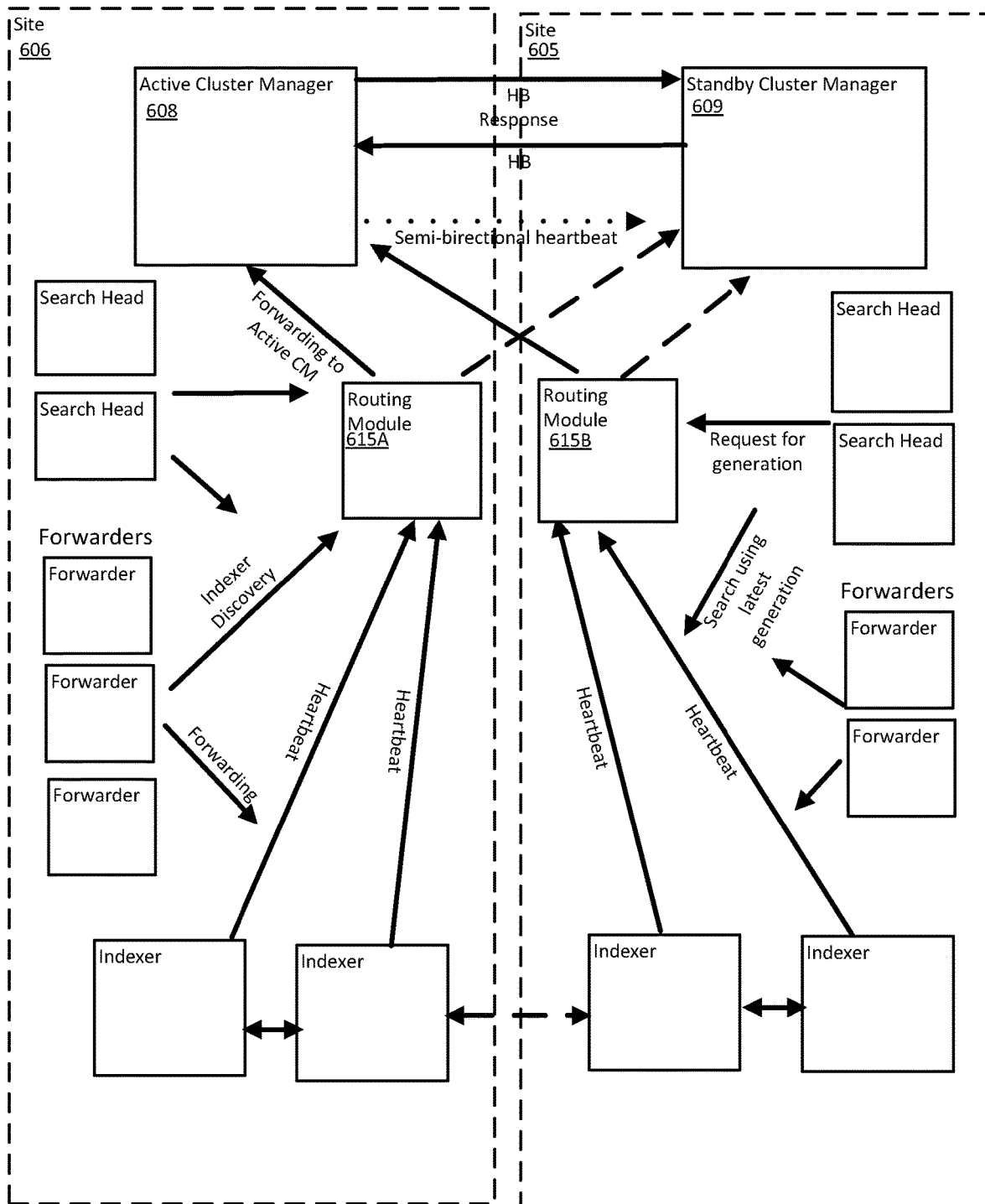
FIG. 6B is a block diagram illustrating an alternative implementation for split-brain prevention in a multi-site cluster where each site comprises a dedicated routing module, in implementations according to the present disclosure.

FIG. 6B is a block diagram illustrating an alternative implementation for split-brain prevention in a multi-site cluster where each site comprises a dedicated routing module, in implementations according to the present disclosure. A cluster may be dispersed over multiple sites as discussed in connection with FIG. 6A. FIG. 6B illustrates an alternative implementation where an active CM 608 and a dedicated routing module 615A may be configured at a first site 606, while a standby CM 609 and a dedicated routing module 615B may be configured at a second site 605. The routing module at each site is configured to direct traffic between an active CM of the multi-site cluster and components at a respective site. In other words, instead of sharing a routing module 615 as shown in the implementation of FIG. 6A, each site is configured with its own respective routing module 615, which acts as a gateway between an active CM for the multi-site cluster (e.g., active CM 608) and components (e.g., indexers, forwarders, search heads) associated with the respective site. CM failover between the active and standby CMs is implemented by configuring the routing modules 615A and 615B to direct traffic between components at a respective site and whichever of the two CMs has an 'active' role. Note that the split-brain prevention strategy discussed in connection with FIGS. 6A and 6B can also be implemented in the single-site cluster implementation of FIG. 5.

Figure 7:
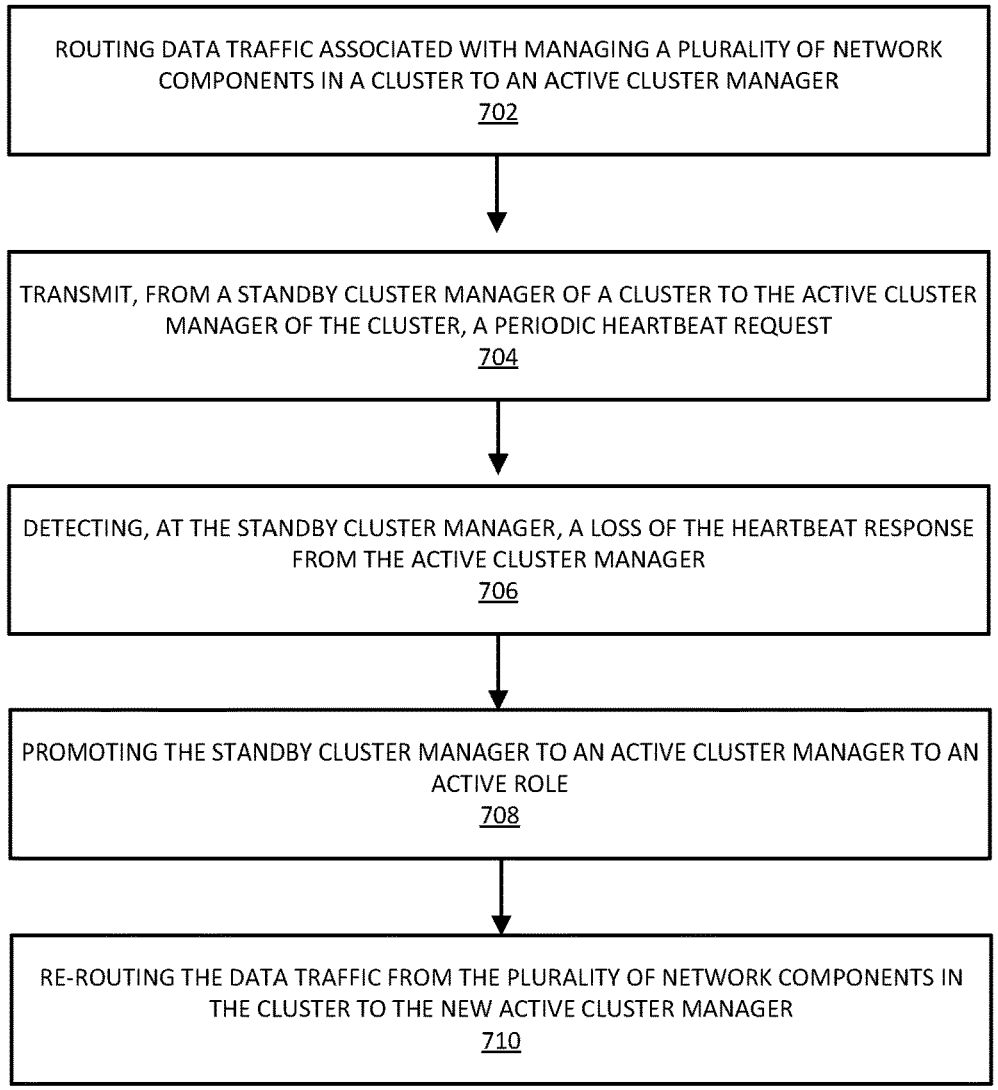
FIG. 7 is a flowchart illustrating an example of a computer-implemented method of providing for dynamic cluster manager failover, in implementations according to the present disclosure.

FIG. 7 is a flowchart illustrating an example of a computer-implemented method of providing for dynamic CM failover, in implementations according to the present disclosure. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, cause the one or more processors to perform the operations of the process 700 of FIG. 7.

At block 702, data traffic associated with managing a plurality of network components (e.g., indexers, search heads, etc.) are routed to an active CM. In one implementation, the routing may be performed, for example, by a routing module, which may be a load balancer or a proxy server.

At block 704, a periodic heartbeat request message is transmitted from a standby CM of a cluster to an active CM, where information in the heartbeat request is used by the active CM to determine a status of the standby CM. Under normal conditions, in response, a heartbeat response message is received at the standby CM, where the heartbeat response message comprises information regarding a status of the active CM and any metadata associated with a state or data associated with the active CM.

At block 706, a loss of the heartbeat response message is detected at the standby CM. In one implementation, the active CM may either be offline or it may be determined as "unhealthy" to a routing module (e.g., routing module 515). In one implementation, in response to the loss of heartbeat response detected at the standby CM, a routing module of the cluster stops forwarding traffic to the active CM.

At block 708, the standby CM promotes itself to the status of the new active CM and advertises itself as "healthy" to the routing module.

At block 710, traffic is redirected towards the new active CM. In one implementation, the traffic is re-routed using a routing module associated with the cluster.

Figure 8:
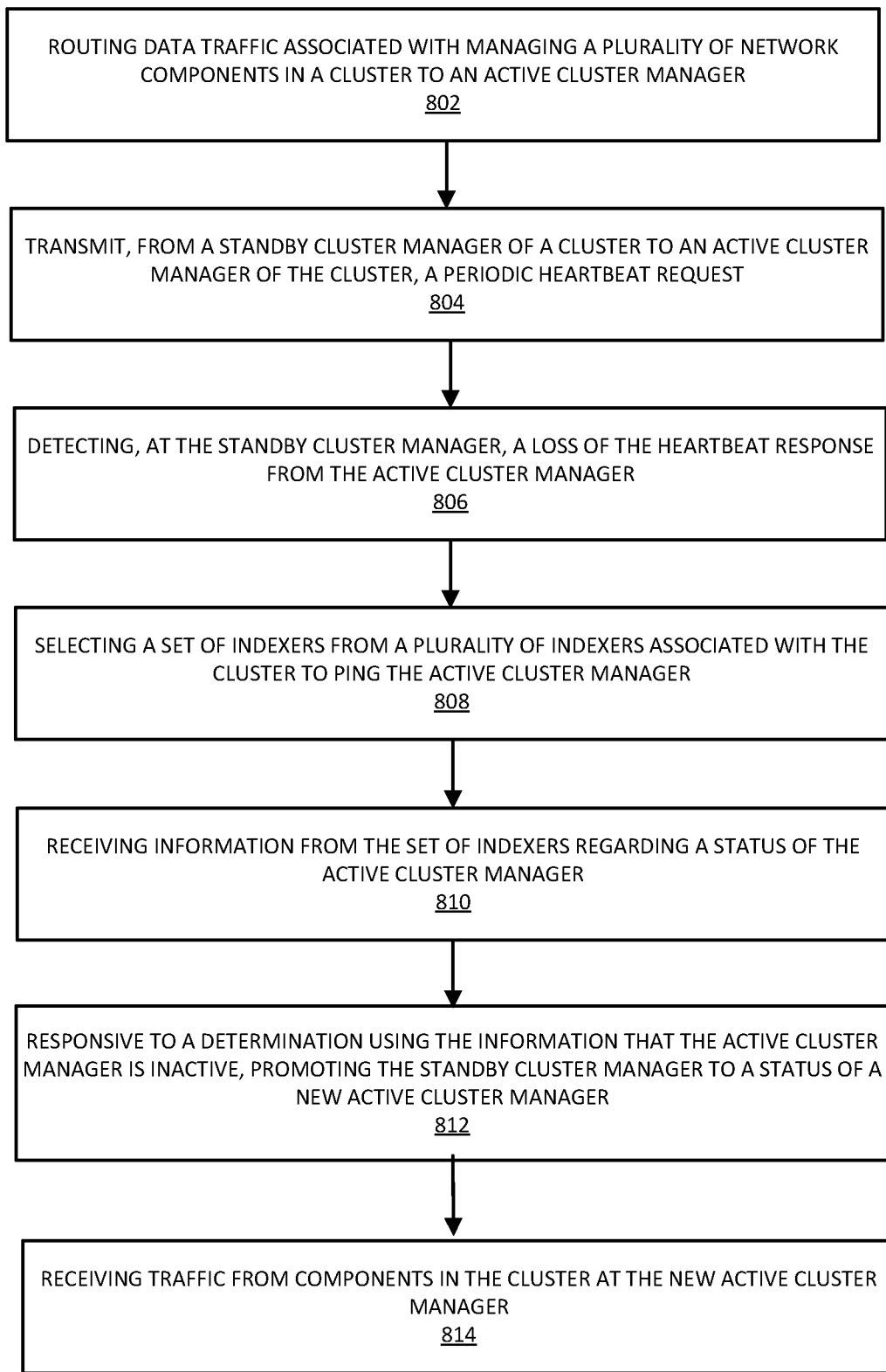
FIG. 8 is a flowchart illustrating an example of a computer-implemented method of preventing a split-brain condition between cluster managers in a cluster, in implementations according to the present disclosure.

FIG. 8 is a flowchart illustrating an example of a computer-implemented method of preventing a split-brain condition between cluster managers in a cluster, in implementations according to the present disclosure. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively or additionally, the process 800 can be implemented using a non-transitory computer-readable medium storing instructions that, when executed by one or more processors, cause the one or more processors to perform the operations of the process 800 of FIG. 8.

At block 802, data traffic associated with managing a plurality of network components (e.g., indexers, search heads, etc.) are routed to an active CM. In one implementation, the routing may be performed, for example, by a routing module, which may be a load balancer or a proxy server.

At block 804, a periodic heartbeat request message is transmitted from a standby CM of a cluster to an active CM, where information in the heartbeat request is used by the active CM to determine a status of the standby CM. Under normal conditions, in response, a heartbeat response message is received at the standby CM, where the heartbeat response message comprises information regarding a status of the active CM and any metadata associated with a state or data associated with the active CM.

At block 806, a loss of the heartbeat response message is detected at the standby CM. In one implementation, the active CM may either be offline or it may be determined as "unhealthy" at a routing module (e.g., routing module 515). In one implementation, in response to the loss of heartbeat response detected at the standby CM, a routing module of the cluster stops forwarding traffic to the active CM.

At block 808, the standby CM selects and requests a set of indexers associated with the cluster to establish communication with or ping the active CM. In one implementation, the indexers may be associated with one or more sites across which the cluster is implemented.

At block 810, the standby CM receives information from the set of indexers regarding a status of the active CM.

At block 812, responsive to determining that the active CM is offline, the standby CM promotes itself to the status of the new active CM. In one implementation, the standby CM advertises itself as "healthy" to the routing module.

At block 814, traffic is received at the new active CM. In one implementation, the traffic is received from a routing module associated with the cluster.

Figure 9:
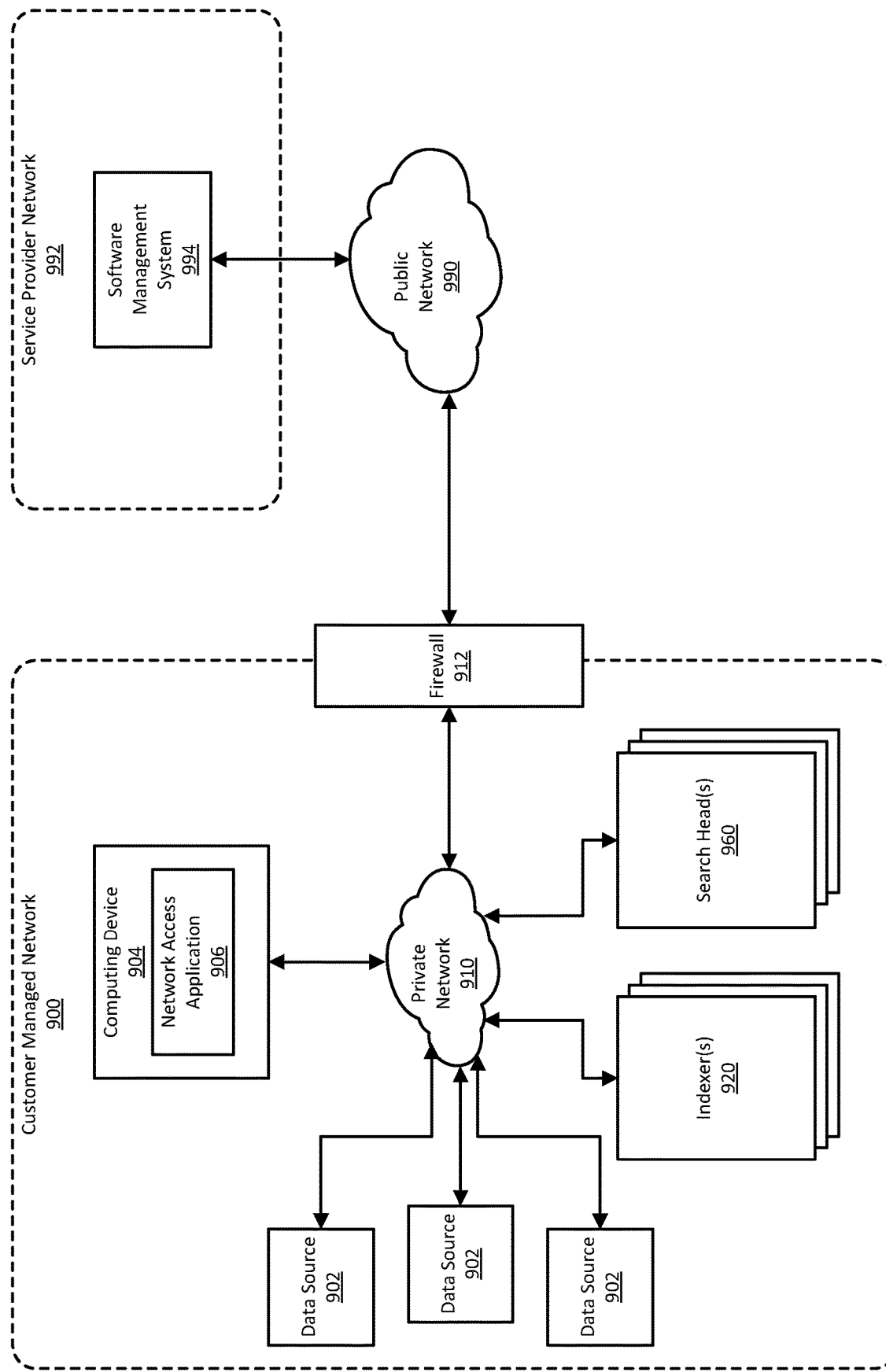
FIG. 9 illustrates an example of a self-managed network that includes a data intake and query system.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method of managing dynamic cluster manager failover, the method comprising:
    routing data traffic associated with managing a plurality of network components in a cluster to a first cluster manager, wherein the first cluster manager is associated with an active role and is operable to manage the plurality of network components in the cluster in a capacity of the active role;
    transmitting periodic heartbeat request messages from a second cluster manager of the cluster to the first cluster manager, wherein the second cluster manager is associated with a standby role;
    detecting, at the second cluster manager, a loss of heartbeat response messages from the first cluster manager, wherein the heartbeat response messages are transmitted from the first cluster manager to the second cluster manager in response to the periodic heartbeat request messages, and wherein each of the heartbeat response messages comprises information that is compared with a status of the first cluster manager maintained by the second cluster manager to detect changes at the first cluster manager;
    promoting the second cluster manager to switch over from the standby role to the active role; and
    re-routing the data traffic associated with the managing the plurality of network components to the second cluster manager in a capacity of the active role.

2. The method of claim 1, wherein the detecting the loss of heartbeat response messages comprises determining that the loss of the heartbeat response message has exceeded a predetermined duration of time.

3. The method of claim 1, wherein the detecting the loss of heartbeat response messages comprises determining that a predetermined number of heartbeat request messages did not receive corresponding heartbeat response messages from the second cluster manager.

4. The method of claim 1, wherein the plurality of network components are selected from a group including indexers for indexing data from one or more data sources, forwarders for forwarding the data to the indexers, and search heads for directing search queries to the indexers to search the indexed data.

5. The method of claim 1, wherein the routing and the re-routing are performed using a proxy server or a load balancer.

6. The method of claim 1, wherein the plurality of network components comprise indexers to index data, and wherein the detecting the loss of heartbeat response messages comprises confirming that the first cluster manager is inactive by attempting to contact the first cluster manager using the indexers.

7. The method of claim 1, wherein information in the periodic heartbeat request message conveys a status of the second cluster manager to the first cluster manager.

8. The method of claim 1, further comprising:
while the second cluster manager is in the active role, initiating a recovery process by transmitting a first heartbeat request message from the second cluster manager to the first cluster manager, wherein the first heartbeat request message is transmitted periodically while the second cluster manager waits to receive a response from the first cluster manager;
responsive to receiving a second heartbeat request message from the first cluster manager at the second cluster manager, checking preset configurations to determine which one between the first and second cluster manager will assume the active role.

9. The method of claim 1, further comprising:
while the second cluster manager is in the active role, initiating a recovery process by transmitting a first heartbeat request message from the second cluster manager to the first cluster manager, wherein the first heartbeat request message is transmitted periodically while the second cluster manager waits to receive a response from the first cluster manager;
responsive to receiving a second heartbeat request message from the first cluster manager at the second cluster manager, checking a priority list to determine which one between the first and second cluster manager is associated with a higher priority; and
responsive to the checking the priority list, nominating a cluster manager associated with the higher priority as the active role.

10. A computing device, comprising:
a processor; and
a non-transitory computer-readable medium having stored thereon instructions that, when executed by the processor, cause the processor to perform operations including:
routing data traffic associated with managing a plurality of network components in a cluster to a first cluster manager, wherein the first cluster manager is associated with an active role and is operable to manage the plurality of network components in the cluster in a capacity of the active role;
transmitting periodic heartbeat request messages from a second cluster manager of the cluster to the first cluster manager, wherein the second cluster manager is associated with a standby role;
detecting, at the second cluster manager, a loss of heartbeat response messages from the first cluster manager, wherein the heartbeat response messages are transmitted from the first cluster manager to the second cluster manager in response to the periodic heartbeat request messages, and wherein each of the heartbeat response messages comprises information that is compared with a status of the first cluster manager maintained by the second cluster manager to detect changes at the first cluster manager;
promoting the second cluster manager to switch over from the standby role to the active role; and
re-routing the data traffic associated with the managing the plurality of network components to the second cluster manager in a capacity of the active role.

11. The computing device of claim 10, wherein the detecting the loss of heartbeat response messages comprises determining that the loss of the heartbeat response messages has exceeded a predetermined duration of time.

12. The computing device of claim 10, wherein the detecting the loss of heartbeat response messages comprises determining that a predetermined number of heartbeat request messages did not receive corresponding heartbeat response messages from the second cluster manager.

13. The computing device of claim 10, wherein the plurality of network components are selected from a group including indexers for indexing data from one or more data sources, forwarders for forwarding the data to the indexers, and search heads for directing search queries to the indexers to search the indexed data.

14. The computing device of claim 10, wherein the routing and the re-routing are performed using a proxy server or a load balancer.

15. The computing device of claim 10, wherein the plurality of network components comprise indexers to index data, and wherein the detecting the loss of heartbeat response messages comprises confirming that the first cluster manager is inactive by attempting to contact the first cluster manager using the indexers.

16. A non-transitory computer-readable medium having stored thereon instructions that, when executed by one or more processors, cause the one or more processor to perform operations including:
routing data traffic associated with managing a plurality of network components in a cluster to a first cluster manager, wherein the first cluster manager is associated with an active role and is operable to manage the plurality of network components in the cluster in a capacity of the active role;
transmitting periodic heartbeat request messages from a second cluster manager of the cluster to the first cluster manager, wherein the second cluster manager is associated with a standby role;
detecting, at the second cluster manager, a loss of heartbeat response messages from the first cluster manager, wherein the heartbeat response messages are transmitted from the first cluster manager to the second cluster manager in response to the periodic heartbeat request messages, and wherein each of the heartbeat response messages comprises information that is compared with a status of the first cluster manager maintained by the second cluster manager to detect changes at the first cluster manager;
promoting the second cluster manager to switch over from the standby role to the active role; and
re-routing the data traffic associated with the managing the plurality of network components to the second cluster manager in a capacity of the active role.

17. The non-transitory computer-readable medium of claim 16, wherein the detecting the loss of heartbeat response messages comprises determining that the loss of the heartbeat response messages has exceeded a predetermined duration of time.

18. The non-transitory computer-readable medium of claim 16, wherein the detecting the loss of heartbeat response messages comprises determining that a predetermined number of heartbeat request messages did not receive corresponding heartbeat response messages from the second cluster manager.

19. The non-transitory computer-readable medium of claim 16, wherein the plurality of network components are selected from a group including indexers for indexing data from one or more data sources, forwarders for forwarding the data to the indexers, and search heads for directing search queries to the indexers to search the indexed data.

20. The non-transitory computer-readable medium of claim 16, wherein the routing and the re-routing are performed using a proxy server or a load balancer.

* * * * *